No. 759,834. PATENTED MAY 10, 1904.
B. M. STEELE.
MEANS FOR UNITING SHEET METAL PARTS.
APPLICATION FILED DEC. 3, 1902.
NO MODEL.
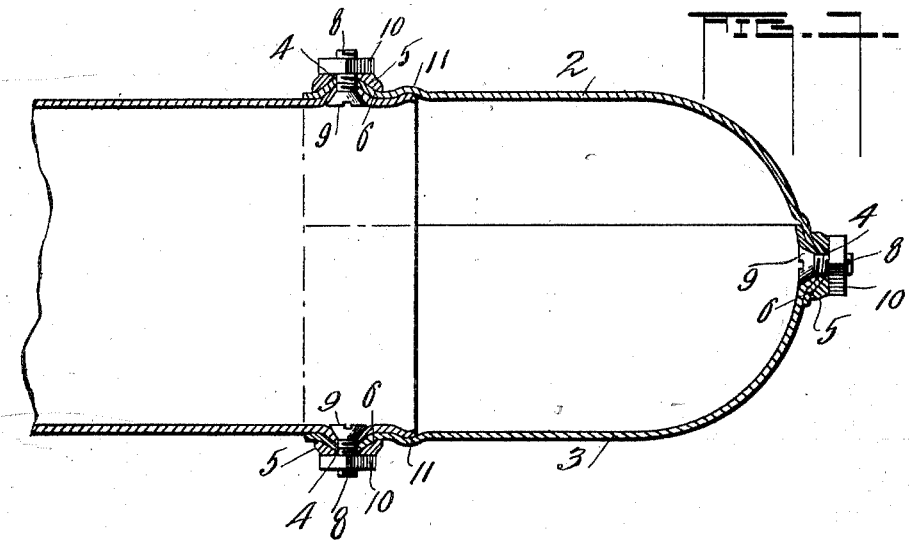
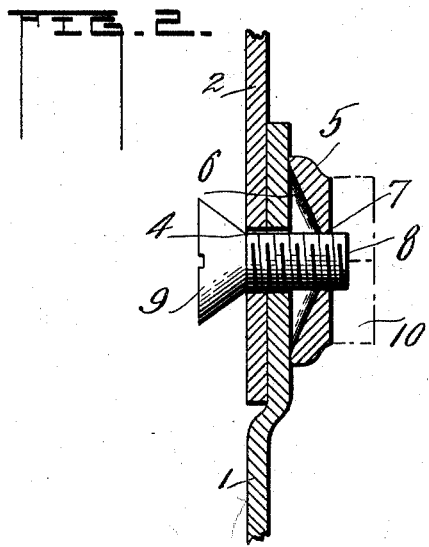
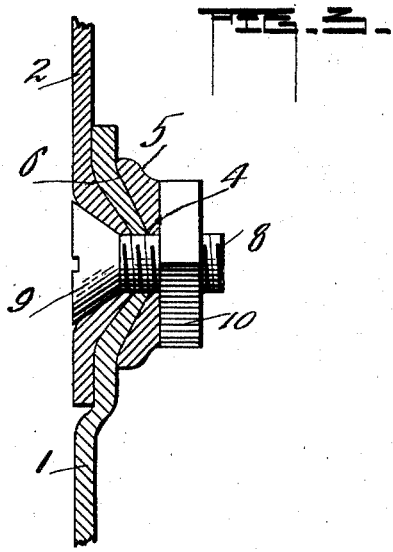
Witnesses:
Irwin L. Fuller.
Geo. J. Jochem
Inventor,
Benjamin M. Steele,
By Chas. H. La Carte.
Atty.

No. 759,834.

Patented May 10, 1904.

UNITED STATES PATENT OFFICE.

BENJAMIN M. STEELE, OF PEORIA, ILLINOIS.

MEANS FOR UNITING SHEET-METAL PARTS.

SPECIFICATION forming part of Letters Patent No. 759,834, dated May 10, 1904.

Application filed December 3, 1902. Serial No. 133,775. (No model.)

*To all whom it may concern:*

Be it known that I, BENJAMIN M. STEELE, a citizen of the United States, residing at Peoria, in the county of Peoria and State of Illinois, have invented certain new and useful Improvements in Means for Uniting Sheet-Metal Parts; and I do hereby declare that the following is a full, clear, and exact description of the invention, which will enable others skilled in the art to which it appertains to make and use the same.

This invention has reference to new and useful improvements in means for uniting sheet-metal parts.

The object of the invention is to unite the sheet-metal tubes of conveyers to sheet-metal head or end sections in a detachable manner and to provide means for drawing a bolt-head and portions of the tube and end sections outwardly to make a smooth inner presented face of the tube or end sections.

The invention consists in the various features of improvements hereinafter described, illustrated in the accompanying drawings, and particularly pointed out by the claims at the end of the specification.

In the drawings, Figure 1 shows a longitudinal section of a sheet-metal tube and a sheet-metal head or end section of two parts, the latter detachably connected together and their half portions detachably connected to the outer end of the tube. Fig. 2 is a sectional view, greatly enlarged, showing the first step in the operation of the manner of fastening the sheet-metal sections together. Fig. 3 is a sectional view, greatly enlarged, of parts similar to those shown in Fig. 2 after the parts have been securely fastened together.

The use of sheet-metal parts in the various arts of manufacture has necessitated their being joined in a detachable manner. Its use, as in the present invention, where the head or end sections of a conveyer or weighing apparatus are of sheet metal, as also the tubes, requires that in joining them in a detachable manner the inner presented face of the tubes must be smooth and void of all obstructions or extensions whereby a conveyer having flights passing through the same the flights will not be interfered with in their passage through the tube.

In Fig. 1 of the drawings I show a sheet-metal tube 1 of an elevator, conveyer, or similar device joined to a head formed of the parts 2 and 3. Where the head and end of the tubes are joined, I employ my device, also where the overlapping portions of the head-sections are contiguous.

The tube 1 and the head-sections have each coinciding perforations 4, which may be previously punched or made at the time of connecting the parts. 5 denotes a washer having a countersunk portion 6 and a central aperture 7.

8 denotes a bolt having, preferably, a tapered or beveled head 9, and 10 is a nut adapted to be screwed onto the end of the bolt. The nut may be independent of the washer or form a part thereof, in which event the entire washer would have to be turned, which may or may not be desirable.

In the operation of connecting the parts of a tube to a head as the adjoining sections of the sheet metal are placed one upon the other to bring their matching perforations 4 coincident a bolt 8 is passed through from the inner side of the sections. The washer 5 is then slipped over the end of the bolt to bring its countersunk or beveled face adjacent to the outer sections of the adjoining parts, and the nut 10 is then screwed onto the bolt to bear against the washer. By screwing up the nut it causes the head of the bolt to be drawn to the countersink of the washer and presses the sections of the sheet-metal parts into such countersink portions of the washer until the face of the head of the bolt is flush with the inner face of the adjoining sections of sheet metal, substantially as seen in Figs. 1 and 3.

In conveyers and elevators where a sheet-metal tube has heretofore been employed the end sections have been made of cast metal which is of such thickness that it has been very easy to attach the parts to each other; but in making the entire apparatus of sheet metal (both tubes and end or head sections) it is not possible to attach the parts to leave a smooth inner face of the tube void of all projections unless some such device as I show is employed, and the countersunk washer has proven very practical, cheapens the cost of manufacture, and enables me by such use to greatly reduce the weight of same.

In addition to the means just described for connecting the tubes and end sections I also swage the tubes 1 and sections 2 and 3 together by corrugating the sections 2 and 3, as at 11, and swaging the ends of the tubes therein, which is a supplemental means for fixedly retaining the parts together.

By the joining means shown for sheet-metal parts it will be readily seen that they may be very easily detached and reassembled if for any cause the parts are pressed or bent out of shape or if it is desired to take them apart for any other reason, being very desirable where a machine is at work in the field.

I am aware that sections of metal composing a radiator have been riveted together by placing a washer between the matching sections which has a hole conforming to the head of a rivet and wherein the sheet around the head of the rivet is drawn down into the washer on "closing it down." It will be readily seen that such a structure would not serve in this case, as the metal sections must lie in juxtaposition to each other and the washer employed upon the outside and a bolt used instead of a rivet; also that metal tapes have been joined by riveting and the heads of the rivets countersunk into the metal to leave a smooth acting face of the tape, especially for conveying purposes. All of such features I disclaim, as they are not practical, for the reason that the parts cannot be detached when once assembled, and for the further reason that they are impracticable for the uses herein.

Having thus fully described my invention, what I claim, and desire to secure by Letters Patent of the United States, is—

1. The herein-described means for joining sections of sheet metal, comprising a countersunk washer, a bolt passing through the sections and washer, and a nut for drawing the head of the bolt and metal sections into the countersunk portions of the washer, for the purposes specified.

2. In combination, the sections of sheet-metal tube and head section, having coinciding perforations, a bolt passed through the perforations from the inner side, a countersunk washer bearing around the bolt upon the outside of the section, and a nut for drawing the head of the bolt and metal sections into the countersunk portion of the washer, for the purposes specified.

3. In combination, the sections of sheet-metal tube and end sections having coinciding perforations, swaged portions of the tube and end section, a bolt passing through the perforations from the tube side, a countersunk washer bearing around the bolt and having its countersunk face adjacent to the outer wall of the end section, and means for drawing the head of the bolt and metal surrounding said head into the washer to leave a smooth inner face of the tube, substantially as specified.

4. In combination, a sheet-metal tube, a sheet-metal head-section of several parts, means for detachably connecting the parts of the head together and the head to the tube, comprising a countersunk washer bearing against the outer face of adjacent parts, a bolt passing through the thicknesses of metal and washer, and a nut for drawing the head of the bolt and metal around such bolt into the countersunk portion of the washer, substantially as specified.

5. In combination, sheet-metal parts lying in juxtaposition to each other and having coinciding perforations, a washer having a countersunk portion adjacent to the face of the outer part, a bolt passing through the metal from the inner side and through the washer, having a tapered head, and a nut adapted to engage the bolt for causing its tapered head to press the sheet-metal parts into the washer and bring the head of the bolt flush with the face of the metal part, substantially as specified.

6. In sheet-metal joining, the combination of a tube, a head-section for the end of the tube comprising two half-sections, each section having coinciding corrugated portion and the end of said tube swaged in such corrugations.

In testimony whereof I affix my signature in presence of two witnesses.

BENJAMIN M. STEELE.

Witnesses:
ROBERT N. MCCORMICK,
CHAS. W. LA PORTE.